(12) United States Patent
Kobayashi et al.

(10) Patent No.: US 6,796,392 B2
(45) Date of Patent: Sep. 28, 2004

(54) WALK-BEHIND, SELF-PROPELLED WORKING MACHINE

(75) Inventors: Takao Kobayashi, Wako (JP); Tetsuo Iida, Wako (JP); Hiromitsu Sasaki, Wako (JP); Tomoaki Ishikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 85 days.

(21) Appl. No.: 10/124,356

(22) Filed: Apr. 16, 2002

(65) Prior Publication Data

US 2002/0153179 A1 Oct. 24, 2002

(30) Foreign Application Priority Data

Apr. 20, 2001 (JP) ........................................ 2001-123276

(51) Int. Cl.[7] ................................................ A01D 34/80
(52) U.S. Cl. ........................ 180/19.3; 56/11.1; 56/14.8; 180/324
(58) Field of Search .............................. 180/19.3, 19.2, 180/19.1, 324, 332, 333, 336; 56/10.8, 14.8, 11.1

(56) References Cited

U.S. PATENT DOCUMENTS

| 4,573,307 A | * | 3/1986 | Wick | ........................... 56/11.8 |
|---|---|---|---|---|
| 4,813,214 A | * | 3/1989 | Barnard et al. | ............... 56/11.3 |
| 4,856,264 A | * | 8/1989 | Nishimura et al. | ........... 56/10.9 |
| 4,930,369 A | * | 6/1990 | Barnard et al. | ............ 74/480 R |
| 5,119,632 A | * | 6/1992 | Nishimura et al. | ............ 60/487 |
| 2002/0073671 A1 | * | 6/2002 | Kucera et al. | ............... 56/10.8 |

FOREIGN PATENT DOCUMENTS

| JP | 05013140 | | 4/1993 |
|---|---|---|---|
| JP | 6-127424 | * | 5/1994 |
| JP | 2516480 | | 8/1996 |
| JP | 2812836 | | 8/1998 |

* cited by examiner

*Primary Examiner*—Anne Marie Boehler
(74) *Attorney, Agent, or Firm*—Adams & Wilks

(57) ABSTRACT

A working machine has an operation switching lever mounted on a handle in the vicinity of a handle grip and is arranged to be manipulated by one of the hands of the operator to transmit or interrupt a driving force outputted from the drive source to the working tool. A drive switching lever is mounted on the handle and is arranged to be manipulated by one of the hands of the operator to operate a continuously variable transmission to switch driving wheels from a halt condition to a high-speed advancement condition. A disc is mounted on the handle for undergoing rotational movement relative to the drive switching lever. A control member positions the disc at a preselected angular position relative to the drive switching lever to regulate an amount of pivotal movement of the drive switching lever for adjusting a rotational speed of the driving wheels.

20 Claims, 15 Drawing Sheets

L1 < L2

WALK-BEHIND, SELF-PROPELLED WORKING MACHINE

FIELD OF THE INVENTION

The present invention relates to an improvement in a walk-behind, self-propelled working machine which is maneuvered by an operator walking behind and using its handle while the working machine is running.

BACKGROUND OF THE INVENTION

A conventional walk-behind, self-propelled working machine is disclosed, for example, in Japanese Utility Model Post-Exam Publication No. HEI-5-13140 entitled "Operating System for Grass Cutting Machine."

Conventional working machine has a body, a pair of rear wheels as driving wheels provided at the body, a grass cutter, an engine for driving these components, and a hydraulic transmission interposed between the engine and the pair of rear wheels. This working machine is a walk-behind, self-propelled grass cutting machine having operating left and right pipes extending from a rear end of the body in a rearward and upward direction.

The above working machine has a U-shaped handle with a handle grip integrally provided extending between the top end of the left pipe and the top end of the right pipe. A shift lever is mounted to a longitudinally middle part of the left pipe. A cutter operating lever is rotatably mounted to the top end of the left pipe. A U-shaped neutral lever is rotatably mounted at its both ends to the top ends of the left and right pipes.

Gripping the cutter operating lever with the handle turns on a clutch interposed between an output shaft of the engine and the cutter, thereby transmitting driving force of the engine to the cutter for grass cutting operation. Gripping the neutral lever with the handle operates the hydraulic transmission, thereby rotating the pair of rear wheels and propelling the working machine forward. Swinging the shift lever back and forth controls the hydraulic transmission, adjusting the rotational speed of the pair of rear wheels, and thereby adjusting the driving speed of the working machine.

In a general method of using the above grass cutting machine, the shift lever is first operated to adjust the driving speed of the pair of rear wheels prior to the start of grass cutting operation, and then the cutter operating lever and the neutral lever are operated to perform grass cutting operation. Under relatively stable grass cutting conditions in which only grass is grown on flat grounds, for example, such a general method of use is satisfactory.

However, grass cutting conditions are not always stable. In some cases, for example, grass is grown on rough grounds or on grounds with flower beds, garden rocks, or garden trees. In such an unstable place, grass cutting conditions vary frequently. This requires frequent change of the driving speed of the grass cutting machine for beautiful finish of grass cutting.

For varying the driving speed of the grass cutting machine during operation, there are two methods as follows:

A first method comprises taking off the right hand gripping the handle while propelling the grass cutting machine and cutting grass, and swinging the shift lever with the right hand to adjust the hydraulic transmission. This method changes speed during driving, forcing an operator to take an uncomfortable posture due to operation of the handle with only the left hand while operating the shift lever with the right hand. This requires skill in operating the lever so as not to adversely affect completion of the cutting without leaving grass to be cut or cutting grass unevenly.

The second method comprises temporarily stopping the grass cutting machine every time grass cutting conditions vary, adjusting the hydraulic transmission with the shift lever, and thereafter propelling the grass cutting machine. This method repeats the driving and topping of the grass cutting machine under varying grass cutting condition, thereby reducing operating efficiency.

SUMMARY OF THE INVENTION

The present invention provides a walk-behind, self-propelled working machine which allows an operator to easily adjust its driving speed while driving the working machine in a comfortable posture.

According to an aspect of the present invention, there is provided a walk-behind, self-propelled working machine, which comprises: a body; a drive source provided at the body; a pair of driving wheels provided at the body and driven by the drive source; a working tool provided at the body and driven by the drive source; a continuously variable transmission interposed between the drive source and the pair of driving wheels; an operating handle extending from a rear end of the body in a rearward and upward direction; an operation switching lever provided at the handle, for transmitting or interrupting driving force outputted from the drive source to the working tool; a drive switching lever provided at the handle, for operating the continuously variable transmission in order to switch the pair of driving wheels from a halt condition to a high-speed advancement condition; and a speed adjusting rotary control for adjusting the continuously variable transmission in order to adjust the rotational speed of the driving wheels; wherein, the operation switching lever and the drive switching lever are independently provided in the vicinity of a grip of the handle; and the speed adjusting rotary control is provided on one side of the handle in the vicinity of the drive switching lever.

In this invention, the speed adjusting rotary control is provided on the side of the handle in the vicinity of the drive switching lever. That is, the speed adjusting rotary control is disposed near a hand of an operator steering the walk-behind, self-propelled working machine, and the speed adjusting rotary control is rotated to adjust the driving speed of the walk-behind, self-propelled working machine. Specifically, in order to adjust the driving speed of the walk-behind, self-propelled working machine while driving the working machine, an operator continuously grips the drive switching lever together with the handle grip with one hand, rotating the rotary control positioned in the vicinity of the drive switching lever with the other hand which was taken off the grip. Thus the operation switching lever is operated with one hand while the rotary control is operated with the other hand, which increases operability in adjusting the driving speed.

Further, in the present invention, in order to adjust the driving speed while driving the working machine, an operator only moves a hand from the grip of the handle near at hand to the vicinity of the drive switching lever on the side of the handle to operate the speed adjusting rotary control. This results in reduced moving range of the hand. In addition, the operation of only rotating the speed adjusting rotary control reduces the operating range of the hand. As a result, the driving speed of the walk-behind, self-propelled working machine is easily adjusted while the operator drives the working machine in a comfortable steering posture, resulting in improved workability.

Furthermore, since the speed adjusting rotary control is provided on the side of the handle, the speed adjusting rotary control is rotated with a hand put over the side of the handle, eliminating the need for moving both hands off the handle.

In the present invention, the operation switching lever and the drive switching lever are swingably mounted to the handle via left and right support shafts, the operation switching lever has an operating part provided in either of left and right positions with respect to the longitudinal center of the body, and the speed adjusting rotary control is rotatably mounted on one of the support shafts supporting the drive switching lever, being positioned opposite to the operating part of the operation switching lever.

Arranging the drive switching lever and the speed adjusting rotary control in a single place reduces the size and the number of components of peripheral mechanisms of the drive switching lever and the speed adjusting rotary control, preventing peripheral part of the handle from becoming larger and reducing the dimension of the body width. This facilitates operations in narrow working space.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
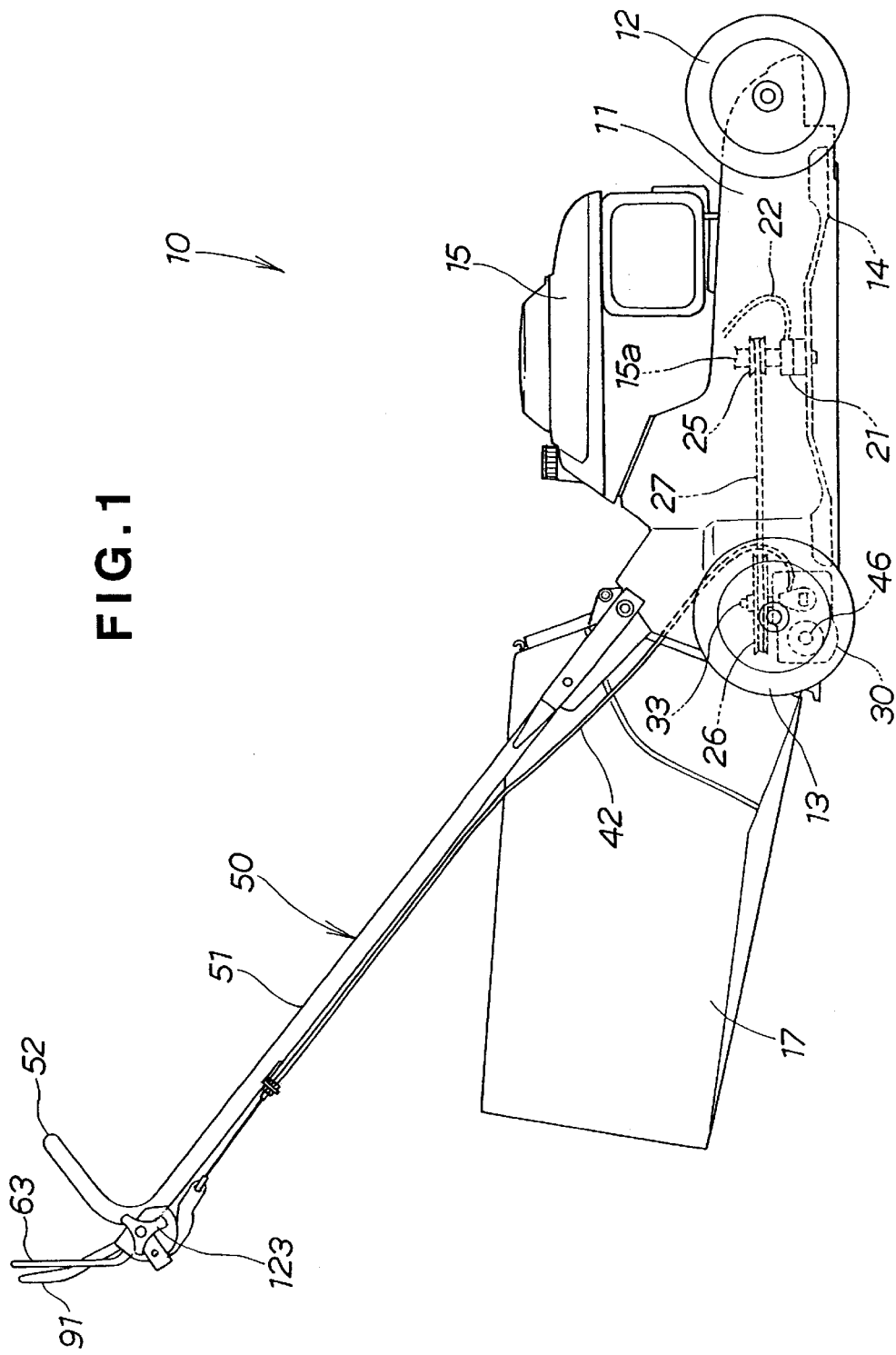
FIG. 1 is a side view of a lawn mower as a walk-behind, self-propelled working machine according to the present invention.

As an example of a walk-behind, self-propelled working machine 10 according to the present invention, FIG. 1 illustrates a lawn mower. Referring to FIG. 1, the lawn mower 10 has a body 11, a pair of front wheels 12 (only one wheel is shown) mounted to the front of the body 11, and a pair of rear wheels (only one wheel is shown) as driving wheels mounted to the rear of the body 11. A grass-cutting blade 14 as a working tool is mounted to an internal middle section of the body 11. An engine 15 as a drive source is mounted on the top of the body 11. The engine 15 drives the pair of rear wheels 13 and the blade 14. A continuously variable transmission 30 is interposed between the engine 15 and the pair of rear wheels 13. The continuously variable transmission 30 varies the driving condition of the rear wheels from a halt condition to a high-speed advancement condition. A handle 50 extends from the body 11 in a rearward and upward direction.

The engine 15 has an output shaft 15a extending downward. The blade 14 is coupled to the output shaft 15a via an operation switching clutch 21. Power of the engine 15 is transmitted from the output shaft 15 through a transmission member consisting of a driving pulley 25, a driven pulley 26 and a belt 27 to an input shaft 33 of the continuously variable transmission 30.

The handle 50 integrally has left and right handle bars 51, 51 extending from the body 11 in a rearward and upward direction, and a grip 52 extending between the rear ends of the handle bars 51, 51. The handle 50 has an operation switching lever 63, a drive switching lever 91, and a control member or speed adjusting rotary control 123 member (hereinafter referred to merely as a "rotary control 123").

The operation switching lever 63 switches the operation switching clutch 21 via a wire cable 22 so as to transmit or interrupt the driving force from the engine 15 to the blade 14.

The drive switching lever 91 is an operating lever for operating the continuously variable transmission 30 by pulling a wire cable 42 so as to switch the pair of rear wheels 13, 13 from a halt condition to a high-speed advancement condition. Reference numeral 17 denotes a grass bag for receiving grass clippings.

The operation switching clutch 21 is a deadman's clutch which switches to allow the driving force from the engine 15 to be transmitted to the blade 14 only when the wire cable 22 is pulled with the operation switching lever 63. Specifically, in a normal condition, the wire cable 22 is continuously biased to a stop position so as to maintain a halt condition of the cutter blade 14.

Figure 2:
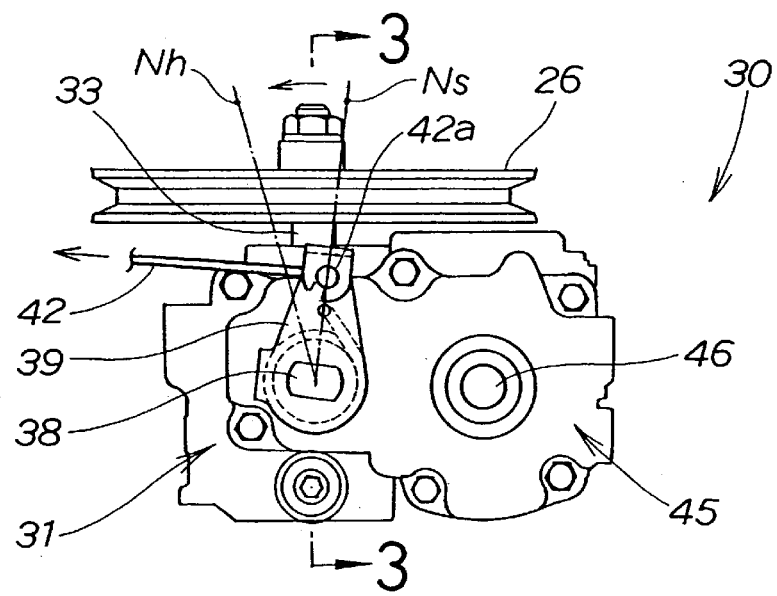
FIG. 2 is a side view of a continuously variable transmission used in FIG. 1.
Figure 3:
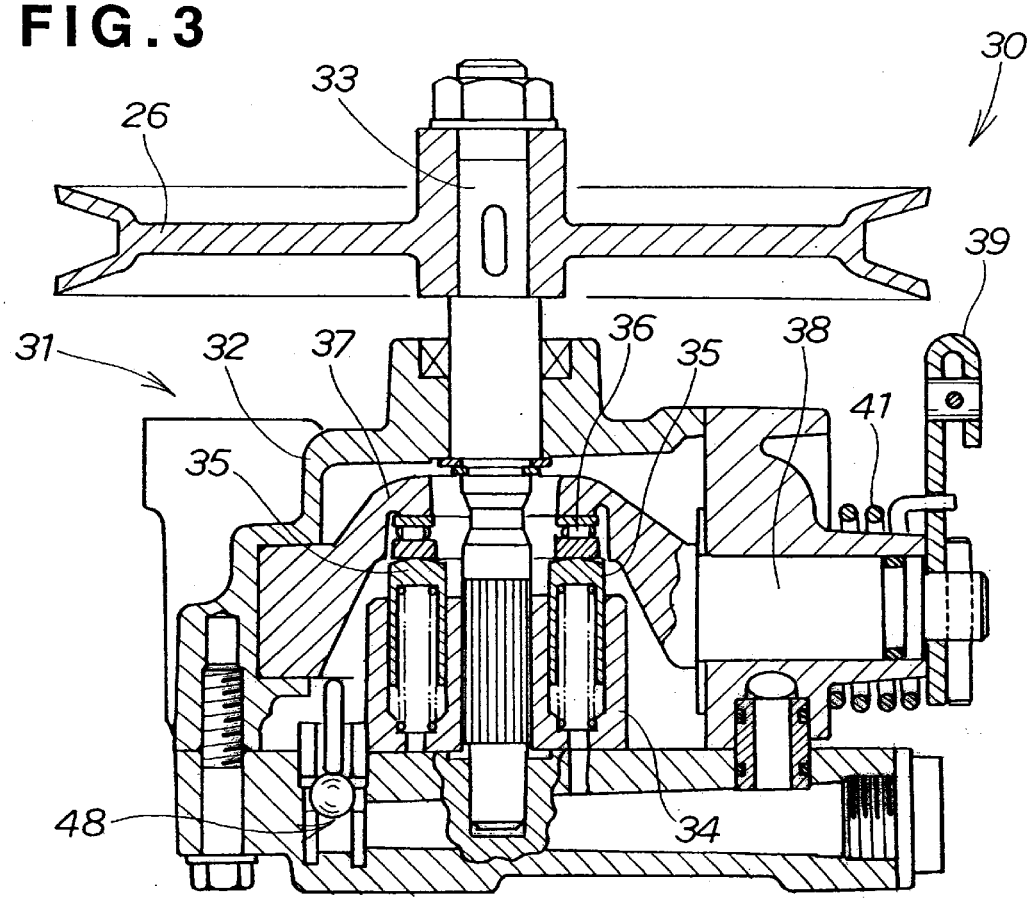
FIG. 3 is an enlarged cross-sectional view taken along line 3—3 in FIG. 2.

FIGS. 2 and 3 illustrate the continuously variable transmission 30 for use in the working machine of the present invention.

The continuously variable transmission 30 has an oil pump 31, an oil motor 45 to be driven by hydraulic pressure from the oil pump 31, a reduction gear mechanism (not shown) coupled to the output of the oil motor 45, and a switching valve 48 for releasing hydraulic pressure from the oil pump 31. This hydraulic continuously variable transmission 30 is a known device as disclosed in Japanese Utility Model Registration No. 2516480 entitled "Vehicle Hydraulic Transmission" or in Japanese Patent No. 2812836 entitled "Continuously Variable Transmission."

The general structure of the continuously variable transmission 30 is described. As illustrated in FIG. 3, the oil pump 31 has a case 32, the input shaft 33 with the driven pulley 26 mounted on its one end extending out from the case 32, a cylinder 34 spline-coupled to the input shaft 33, a plurality of pistons 35 movably fitted into the cylinder 34 to be projected from and pushed into the cylinder 34, a variable speed swash plate 37 abutting on the top ends of the pistons 35 via a thrust bearing 36, a swing shaft 38 integrally formed with the variable speed swash plate 37, an arm 39 mounted on the distal end of the swing shaft 38, and a return spring 41 resiliently biasing the arm 39 to a stop position Ns shown in FIG. 2. A wire end 42a of the wire cable 42 is coupled to the distal end of the arm 39.

The arm 39 is swingable from the stop position Ns to a high-speed advancement position Nh shown in FIG. 2. By pulling the wire cable 42 as shown by an arrow in FIG. 2 to swing the arm 39 in a counterclockwise direction, the variable speed swash plate 37 is swung via the swing shaft 38. The swinging inclination of the variable speed swash plate 37 makes the plurality of pistons 35 move in and out, thereby varying hydraulic pressure applied from the oil pump 31 to the oil motor 45.

When the arm 39 is in the stop position Ns shown in FIG. 2, the variable speed swash plate 37 opens the switching valve 48, thereby releasing hydraulic pressure applied from the oil pump 31 to the oil motor 45. As a result, the output shaft 46 of the oil motor 45 becomes free. In this state, the pair of rear wheels 13 shown in FIG. 1 is freely rotatable. When the arm 39 is not in the stop position Ns, the switching valve 48 is closed.

When the arm 39 is in the high-speed advancement position Nh shown in FIG. 2, the variable speed swash plate 37 is largely inclined, increasing the hydraulic pressure applied from the oil pump 31 to the oil motor 45. As a result, the output shaft 46 of the oil motor 45 rotates at a maximum speed. In this state, the pair of drive wheels 13 rotates at a maximum speed in a forward direction.

Thus, the wire cable 42 swings the arm 39 from the stop position Ns to the high-speed advancement position Nh, thereby switching the pair of rear wheels 13 from a halt condition to a high-speed advancement condition.

Figure 4:
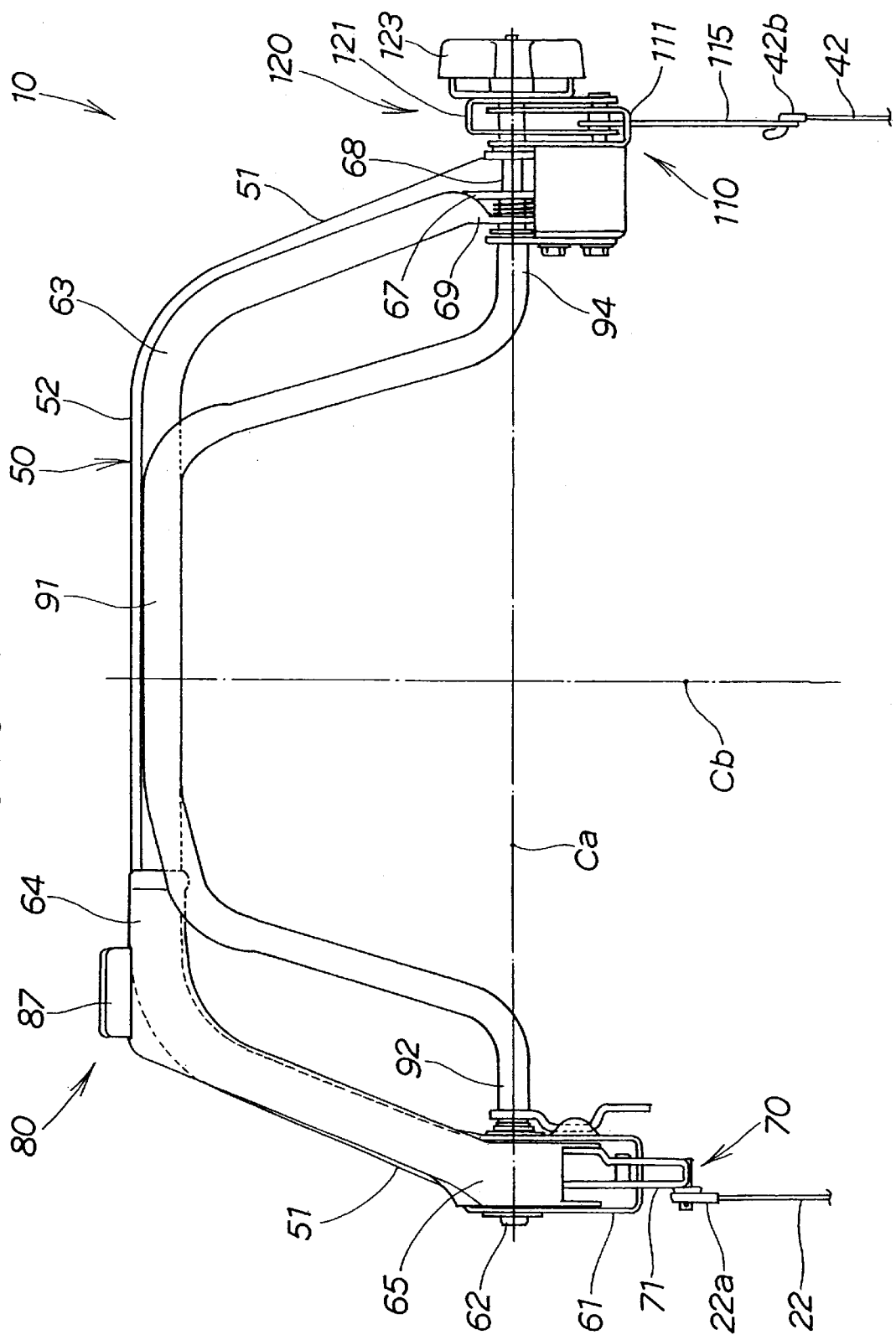
FIG. 4 is a rear view of FIG. 1, illustrating peripheral part of a handle.

FIG. 4 illustrates the peripheral part of the handle 50 according to the present invention. The operation switching lever 63 and the drive switching lever 91 are independently provided in the vicinity of the horizontal grip 52 of the handle 50. The rotary control 123 is provided on the right side of the handle 50 in the vicinity of the drive switching lever 91.

Specifically, to the handle 50, the operation switching lever 63 and the drive switching lever 91 are mounted swingably back and forth (in the figure, in a direction vertical to the sheet surface) on a support axis Ca parallel with the grip 52. The rotary control 123 is rotatably mounted on the support axis Ca in a right side position opposite to an operating part 64 of the operation switching lever 63.

More specifically, the operation switching lever 63 is formed in a reverse U shape when viewed from the rear, substantially identical to the shape of the grip 52 of the handle 50, and has left and right proximal ends 65, 69 mounted on the handle 50 swingably back and forth. The operating part 64 of the operation switching lever 63 is integrally provided in a left position with respect to a body center Cb. The operating part 64 is substantially in a reverse L shape when viewed from the rear.

The drive switching lever 91 is formed substantially in a reverse U shape when viewed from the rear, and has left and right proximal ends 92, 94 extending horizontally to be mounted to the handle 50 swingably back and forth.

Horizontal gripped parts of the operation switching lever 63 and the drive switching lever 91 have substantially the same height as that of the grip 52 of the handle 50.

Figure 5:
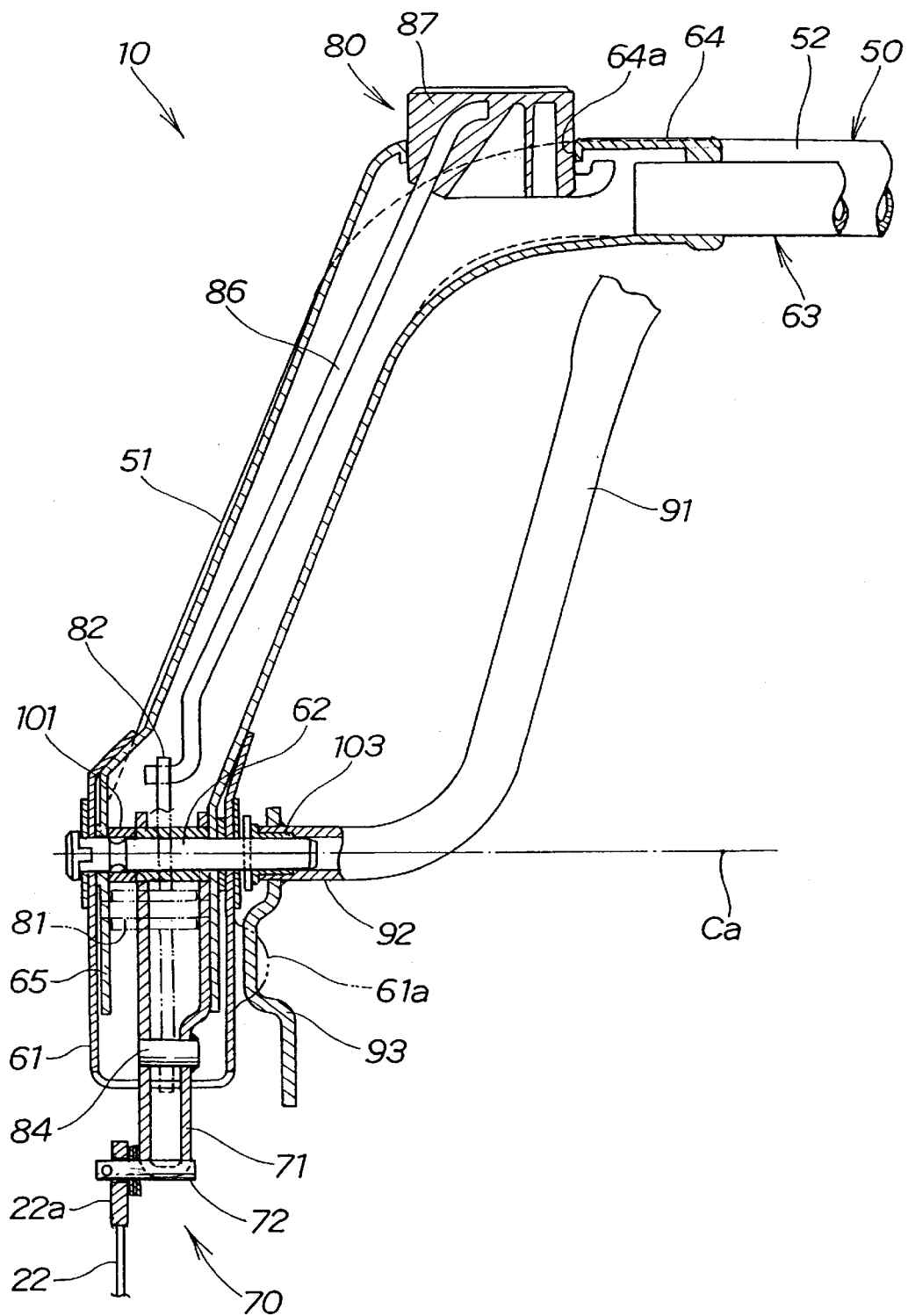
FIG. 5 is an enlarged cross-sectional view of a left half portion of the peripheral part of the handle shown in FIG. 4.

Next, the left-side mounting structures of the operation switching lever 63 and the drive switching lever 91 will be described with reference to FIGS. 5, 6 and 7.

A horizontal left support shaft 62 is mounted via a stay 61 to an upper part of the handle 50, being on the support axis Ca. On the left support shaft 62, the left proximal end 65 of the operation switching lever 63 is mounted swingably back and forth. The left proximal end 92 of the drive switching lever 91 is mounted on the internal end of the left support axis 62 swingably back and forth. Thus, the left ends of the operation switching lever 63 and the drive switching lever 91 are mounted on the single left support shaft 62.

The stay 61 has a bulging-out stopper 61a. An arm 93 of the drive switching lever 91 contacts the stopper 61a, setting the drive switching lever 91 in a neutral position.

An operation switching mechanism 70 and a lever engagement mechanism 80 are incorporated into the left mounting part of the operation switching lever 63.

The operation switching mechanism 70 has a switching arm 71 in a forked shape rotatably mounted on the support shaft 62, and a pin 72 attached to the distal end of the switching arm 71. A wire end 22a of the wire cable 22 is coupled to the pin 72 so as to couple the switching arm 71 to the operation switching clutch 21 shown in FIG. 1 via the wire cable 22. In the figure, reference numeral 101 denotes a spacer, and 103 a bush.

Figure 6:
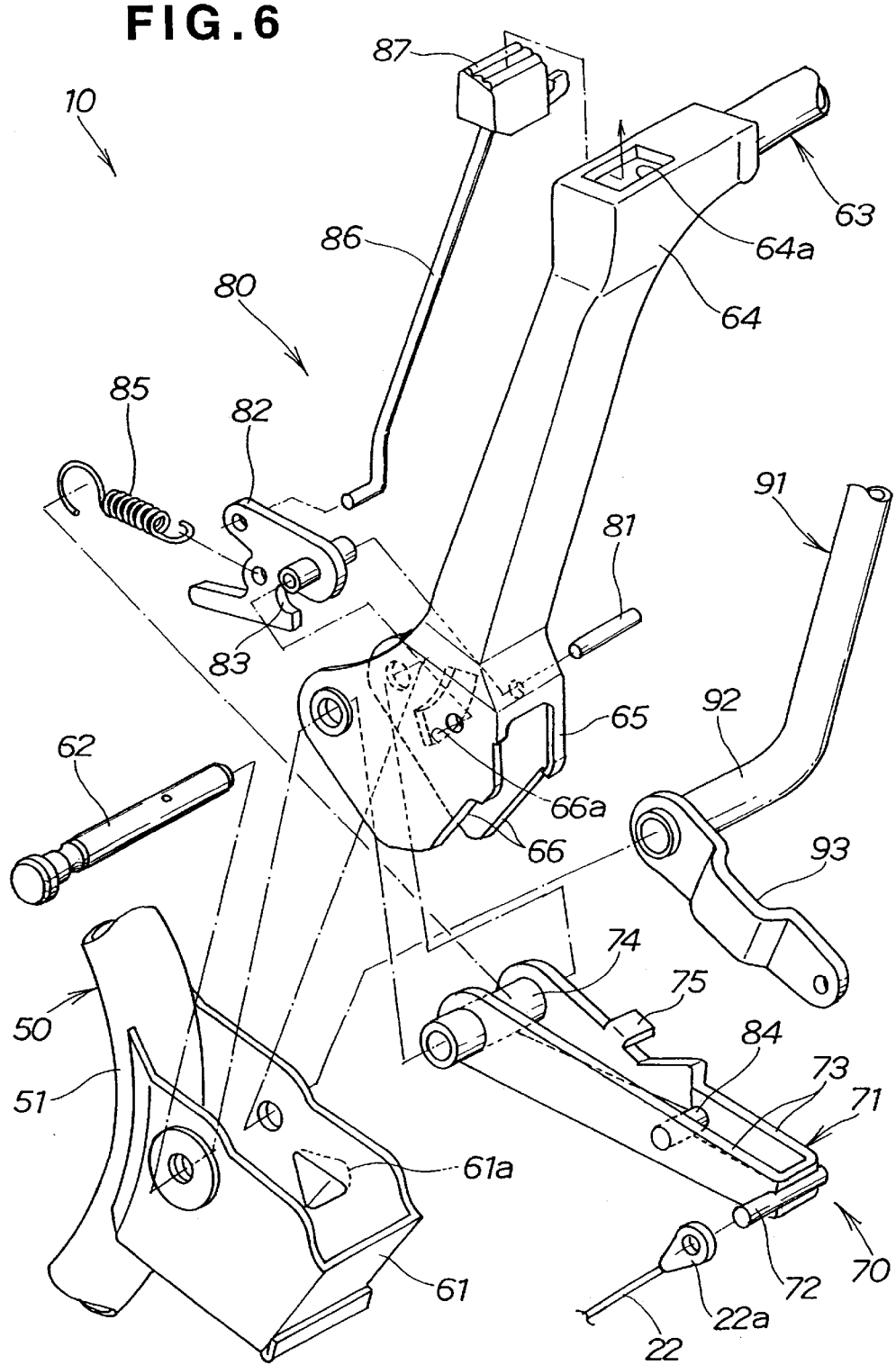
FIG. 6 is an exploded perspective view of the peripheral part of the handle shown in FIG. 5.

As illustrated in FIG. 6, the proximal end 65 of the operation switching lever 63 is held inside the stay 61 in a U shape in a plan view. The proximal end 65 of the operation switching lever 63 has two lever plates 66 in a forked shape, spaced apart in the body width direction. The proximal part of the switching arm 71 is held between the two lever plates 66. The switching arm 71 has two arm plates 73 in a forked shape, spaced apart in the body width direction. An engaging cam 82 is disposed between the two arm plates 73.

A pin 81 is inserted across the two lever plates 66. The switching arm 71 has a bearing pipe 74 at its proximal part. The support shaft 62 is inserted through the bearing pipe 74 to support the switching arm 71 swingably on the support shaft 62.

A restricting claw 75 formed with the switching arm 71 is fitted into a restricting aperture 66a of the lever plate 66 so as to restrict the swinging range of the switching arm 71 with respect to the operation switching lever 63.

Figure 7:
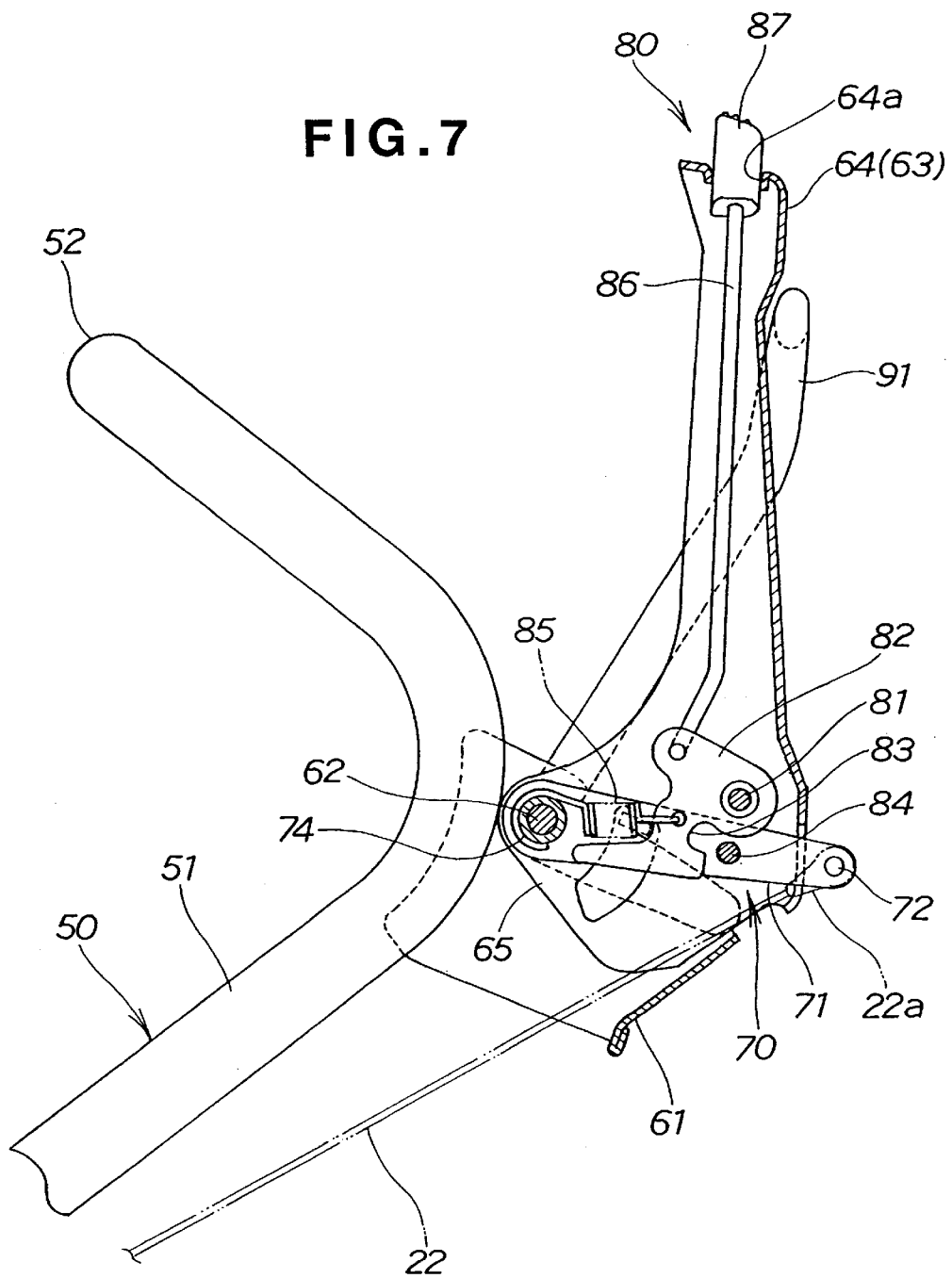
FIG. 7 is a partially cross-sectional view illustrating an operation switching lever and a drive switching lever being in their neutral positions and a lever engagement mechanism being in a disengaged state.

As illustrated in FIG. 7, the lever engagement mechanism 80 has a pin 81 attached to the operation switching lever 63, the engaging cam 82 rotatably mounted on the pin 81, an engagement pin 84 provided at the switching arm 71 to be fitted into a cam groove 83 formed in the engaging cam 82, a return spring 85 pulling the engaging cam 82 in a direction to disengage the cam groove 83 from the engagement pin 84, a rod 86 for rotating the engaging cam 82 in a direction to engage the cam groove 83 with the engagement pin 84, and an engagement operating button 87 provided at the distal end of the rod 86. The engagement operating button 87 is a push button movably fitted in a hole 64a formed in the top end of the operating part 64 of the operation switching lever 63.

Next, the operation of the operation switching lever 63, switching arm 71, and lever engagement mechanism 80 is described with reference to FIGS. 7 to 9.

In FIG. 7, the operation switching lever 63 and the drive switching lever 91 are in neutral positions, and the lever engagement mechanism 80 is in a disengaged state. That is, the lever engagement mechanism 80 has the cam groove 83 of the engaging cam 82 disengaged from the engagement pin 84. Thus the swinging operation of the operation switching lever 63 does not displace the switching arm 71. In this state, the operation switching clutch 21 shown in FIG. 1 is off, interrupting driving force from the engine 15 to the blade 14.

The swinging operation of the operation switching lever 63 and the drive switching lever 91 can be freely performed regardless of whether the lever engagement mechanism 80 is in an engaged or disengaged state.

Figure 8:
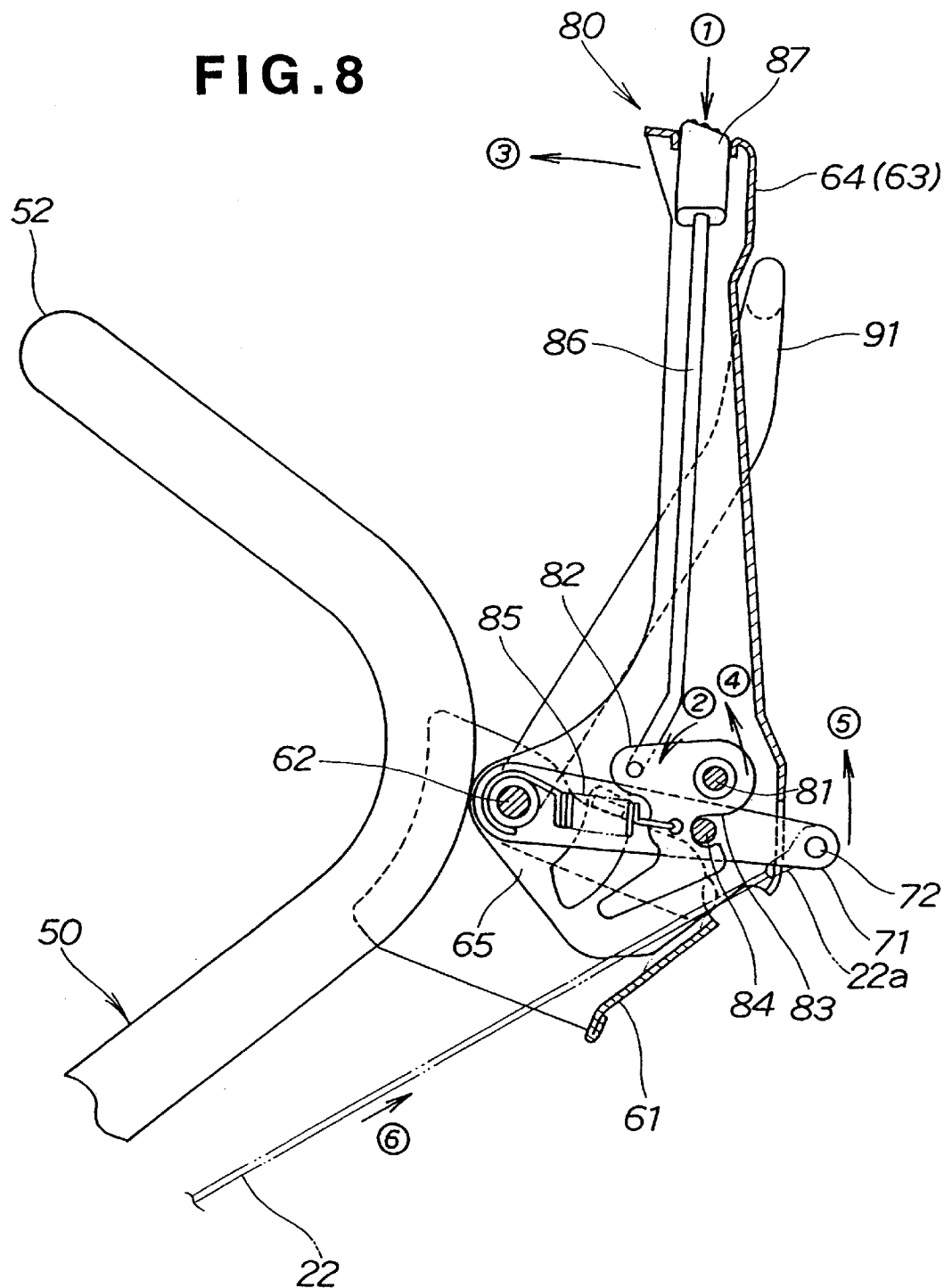
FIG. 8 is a partially cross-sectional view illustrating the lever engagement mechanism being in an engaging state with an engagement operating button pushed from the state in FIG. 7.
Figure 9:
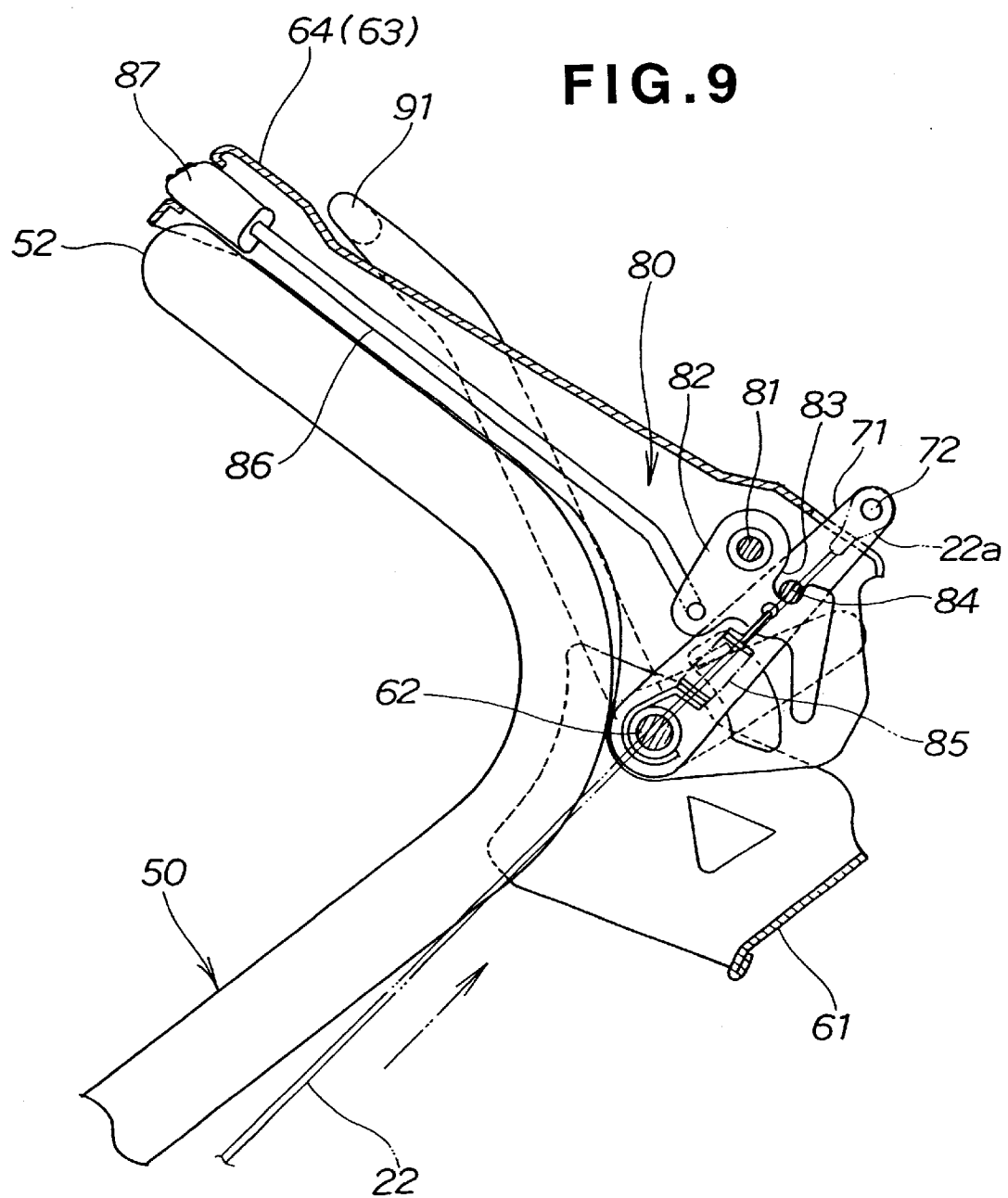
FIG. 9 is a partially cross-sectional view illustrating the operation switching lever swung from the state in FIG. 8 toward a grip of the handle, pulling a wire cable.

When the engagement operating button 87 in the state shown in FIG. 7 is pushed as shown by arrow ① in FIG. 8, pressing down a rod 86, the engaging cam 82 is rotated on the pin 81 counterclockwise as shown by arrow ②, and the cam groove 83 engages the engagement pin 84. Thus the lever engagement mechanism 80 engages the switching arm 71.

Next, with the engagement operating button 87 continuously pushed, the operation switching lever 63 is swung counterclockwise as shown by arrow ③. During the swinging, the engaging cam 82 and the engagement pin 84 swing counterclockwise as shown by arrow ④, together with the operation switching lever 63. The switching arm 71 therefore swings on the support shaft 62 in a direction shown by arrow ⑤, pulling the wire cable 22 in a direction shown by arrow ⑥.

Further, with the engagement operating button 87 still being pushed, the operation switching lever 63 is rotated to the position of the grip 52 of the handle 50. Then the operation switching lever 63 and the grip 52 are gripped together. The wire cable 22 is pulled further to turn on the operation switching clutch 21 shown in FIG. 1, thereby transmitting the driving force outputted from the engine 15 to the blade 14. In summary, the rotational driving of the blade 14 is performed by two-stage operation: the first operation of pushing the engagement operating button 87 and the second operation of swinging the operation switching lever 63.

Thereafter, when released from the grip, the operation switching lever 63 is pulled back by the operation switching clutch 21 shown in FIG. 1 via the wire cable 22, to automatically return to the neutral position shown in FIG. 7. The pulling force of the return spring 85 allows the lever engagement mechanism 80 to automatically return to the disengaged state.

Next, right mounting structures of the operation switching lever 63 and the drive switching lever 91 and the mounting structure of the rotary control 123 will be described in detail with reference to FIGS. 10 and 11.

Figure 10:
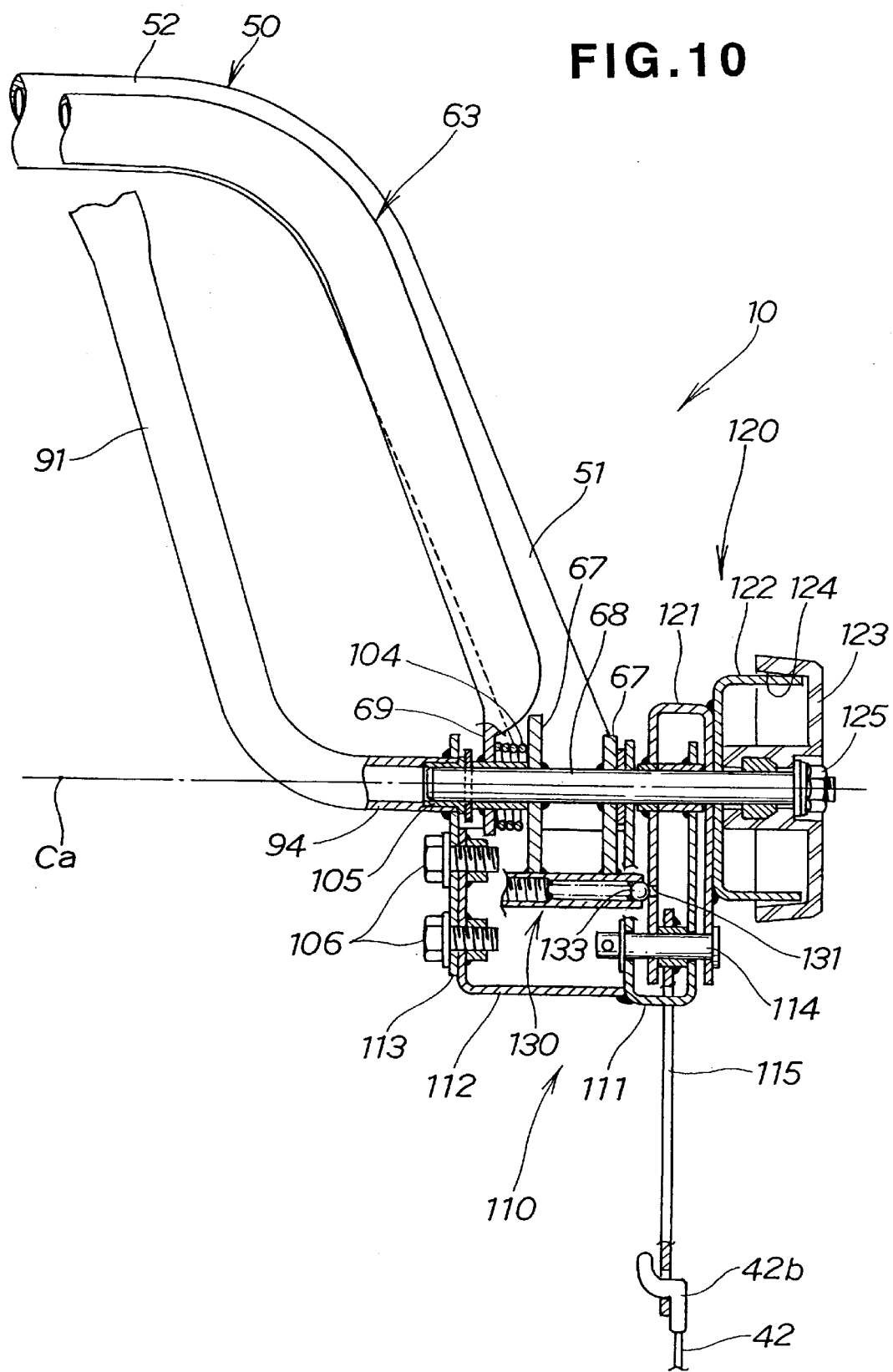
FIG. 10 is a cross-sectional view of a right half portion of the peripheral part of the handle of the present invention shown in FIG. 4.
Figure 11:
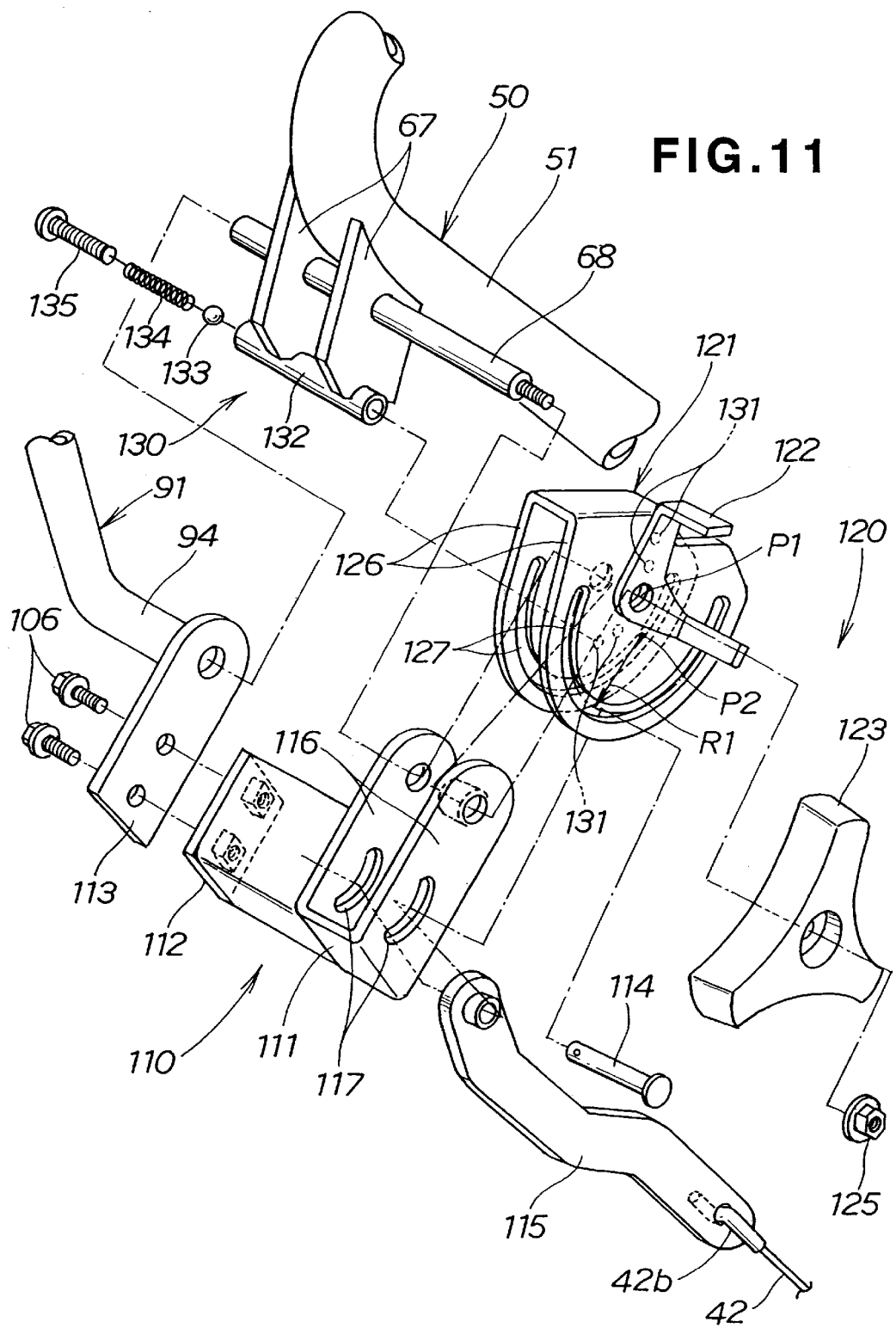
FIG. 11 is an exploded perspective view of the peripheral part of the handle shown in FIG. 10.

As illustrated in FIG. 10, a right support shaft 68 is mounted to an upper portion of the handle 50 via stays 67, 67, being on the support axis Ca. A right proximal end 69 of the operation switching lever 63 is mounted on the right support shaft 68 swingably back and forth. A right proximal end 94 of the drive switching lever 91 is mounted on the internal end of the right support shaft 68 swingably back and forth. Thus, the operation switching lever 63 and the drive switching lever 91 are mounted on the single right support shaft 68. The rotary control 123 is rotatably mounted to the outer end of the right support shaft 68.

Thus arranging the drive switching lever 91 and the rotary control 123 in a single place results in the reduction in size and number of components of the peripheral mechanisms (a speed switching mechanism 110 and a variable speed adjustment mechanism 120, which are described later) of the drive switching lever 91 and the rotary control 123, preventing the peripheral part of the handle 50 from becoming larger, and reducing the body width of the walk-behind, self-propelled working machine 10 (See FIG. 1). This facilitates an operation in narrow working space.

The speed switching mechanism 110 and the variable speed adjustment mechanism 120 are incorporated into a right mounting portion of the drive switching lever 91.

The speed switching mechanism 110 has a shift arm 111 in a forked shape rotatably mounted on an outer end of the right support shaft 68, a stay 112 extending from the side of the shift arm 111 toward the body center, a coupling plate 113 fixed to the right end of the drive switching lever 91, to be mounted to the stay 112, and a coupling arm 115 coupled to a lower end of the shift arm 111 via a coupling pin 114.

A wire end 42b of the wire cable 42 is coupled to the coupling arm 115 which is thus coupled to the arm 39 of the continuously variable transmission 30 shown in FIG. 2 via the wire cable 42.

The variable speed adjustment mechanism 120 has a disc 121 in a forked shape rotatably mounted to an outer end of the right support shaft 68, an engaging claw 122 protruding from the outer surface of the disc 121 toward the outside of the body (in the right direction in FIG. 10), and an engagement groove 124 formed in the rotary control 123 to be engaged with the engaging claw 122. A lower end of the disc 121 is coupled to the shift arm 111 and the coupling arm 115 via the coupling pin 114. With the engagement groove 124 engaged with the engaging claw 122, the rotary control 123 is prevented from rotation with respect to the disc 121.

The drive switching lever 91 is maintained in the neutral position by a repulsive force of the return spring 104. The stay 112 and the coupling plate 113 are coupled via a plurality of fixing bolts 106. In the figure, reference numeral 105 denotes a bush, and 125 a rotary control stopping nut.

As illustrated in FIG. 10, the disc 121 has two disc plates 126 spaced apart in the body width direction. Arc holes 127 of an identical shape are formed in the disc plates 126, respectively. A plurality of positioning holes 131 are formed in the one disc plate 126 opposite to the center of the body (on the left side in the figure).

The arc hole 127 is a semicircular hole having a radius R1 formed through approximately 180 degrees around its center P2 which is offset from the rotational center P1 of the disc 121 in a forward and downward direction (right downward in the figure). The coupling pin 114 is inserted through the arc holes 127. The plurality of positioning holes 131 are arranged with the same pitch in a circular locus with its center identical with the rotational center P1 of the disc 121.

A disc positioning mechanism 130 maintains the rotational position of the disc 121 with a fixed force, and allows the rotation of the disc when rotational force exceeding the fixed force (that is, operating physical force to the rotary control 123) is applied.

The disc positioning mechanism 130 is a click mechanism consisting of the plurality of positioning holes 131, a fit pipe 132 attached to the stay 67 of the handle 50, a lock ball 133 inserted through the fit pipe 132, a compression spring 134 biasing the lock ball 133 toward the positioning holes 131, and an adjusting screw 135 for adjusting the repulsive force of the compression spring 134. The fit pipe 132 is provided parallel with the right support shaft 68.

The lock ball 133 is fitted into one of the plurality of positioning holes 131 to lock the disc 121 and retain the disc 121 in that position. When the disc 121 is forcefully rotated, the compression spring 134 is compressed via the lock ball 133 which is then disengaged from the positioning hole 131 in which it has been fitted, resulting in the rotation of the disc 121.

The shift arm 111 has two arm plates 116 spaced apart in the body width direction. Elongate arc holes 117 of an identical shape are formed in the two arm plates 116, respectively. The coupling pin 114 is inserted through the elongate arc holes 117.

Figure 12:
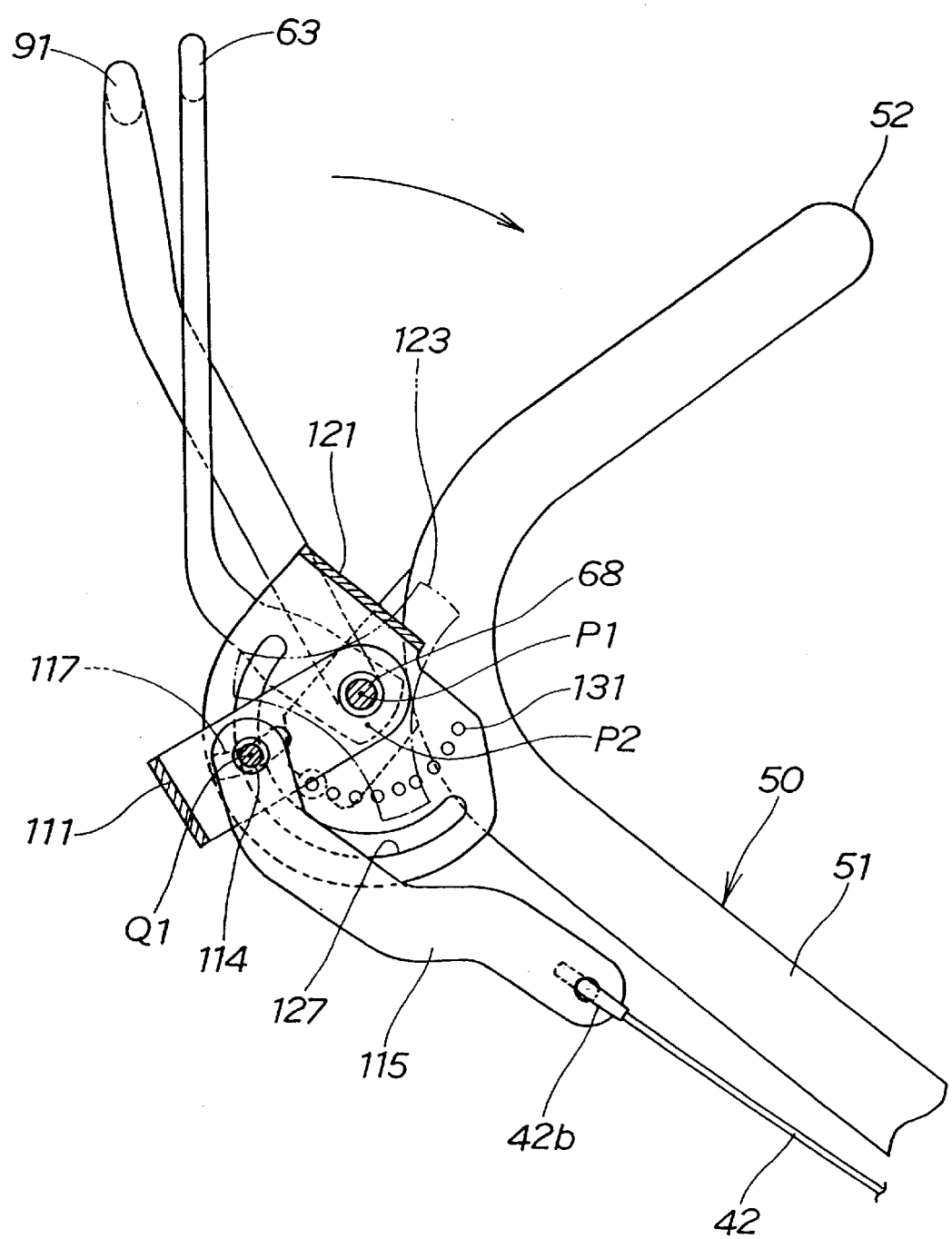
FIG. 12 is a partially cross-sectional view illustrating the relationship among the drive switching lever, a speed adjusting rotary control, a speed switching mechanism and a variable speed adjustment mechanism.

Next, the function of the drive switching lever, rotary control, speed switching mechanism and variable speed adjustment mechanism will be described with reference to FIGS. 12 to 15. FIG. 12 illustrates the disc 121 set in a low-speed position by the rotary control 123 shown by phantom lines.

In the state shown in FIG. 12, the center P2 of the one arc hole 127 is offset from the rotational center P1 of the disc 121 in a forward and downward direction of the body (right downward in the figure), and the arc hole 127 is in a rearward and downward position of the body (left downward in the figure), and the center of the coupling pin 114 is in a position Q1 rearward and downward of the body. The operation switching lever 63 and the drive switching lever 91 are in the neutral positions. From this state, the operation switching lever 63 and the drive switching lever 91 are operated.

Figure 13:
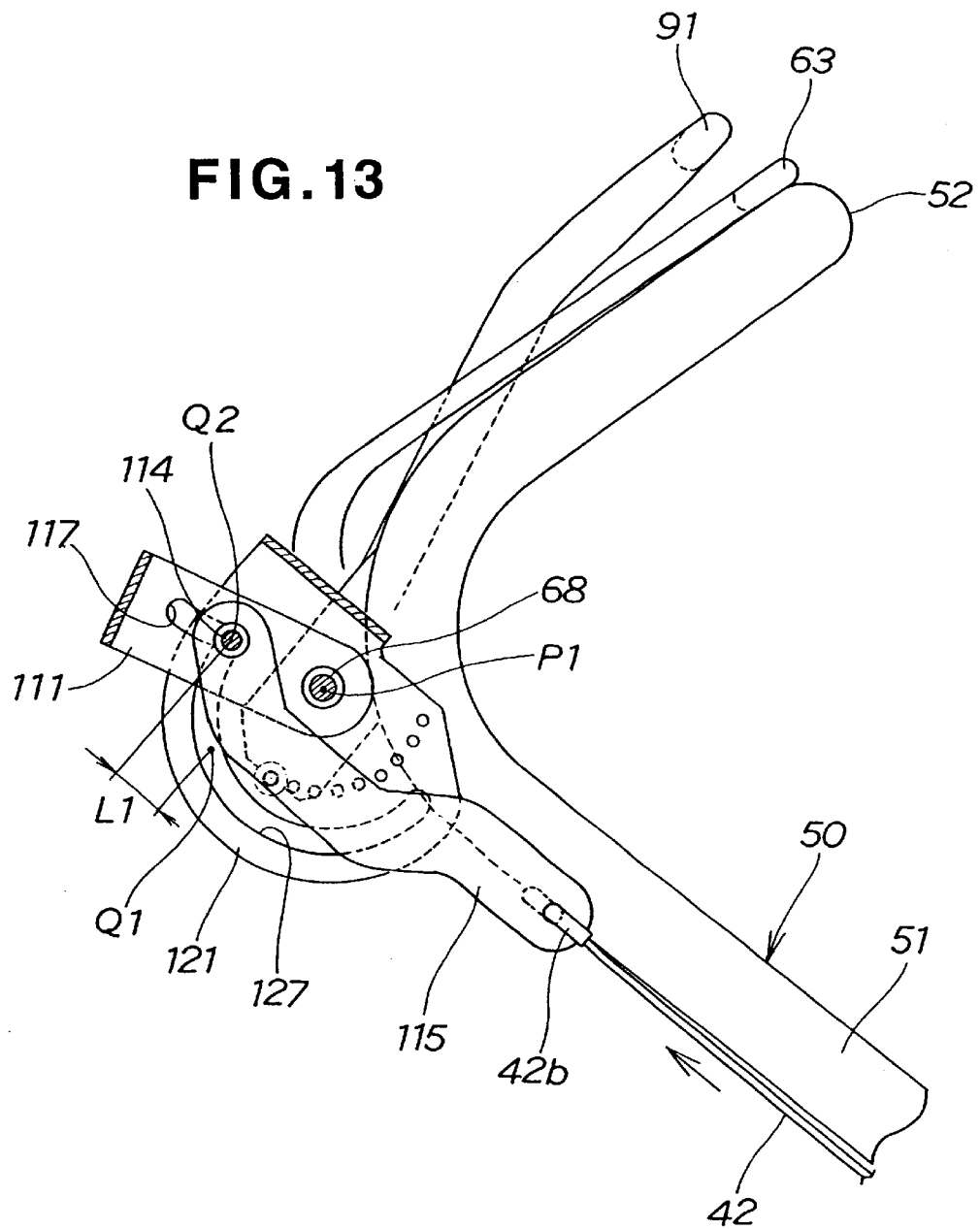
FIG. 13 is a partially cross-sectional view illustrating the drive switching lever rotated from the state shown in FIG. 12 toward the grip of the handle.

As illustrated in FIG. 13, when the drive switching lever 91 is swung clockwise, the shift arm 111 swings in the same direction. As a result, the coupling pin 114 is guided through the arc hole 127, being displaced in a clockwise direction, and contacts the front end of the arc hole 127 and stops its motion. The center of the coupling pin 114 in this state is in a position Q2. That is, the coupling pin 114 moves by a distance (travel amount) L1 from the position Q1 to the position Q2. As a result, the wire cable 42 is pulled via the coupling arm 115 as shown by an arrow by a distance corresponding to the travel amount L1 of the coupling pin 114. The pulling of the wire cable 42 swings the arm 39 of the continuously variable transmission 30 shown in FIG. 2, setting the continuously variable transmission 30 in a low-speed condition. Thus the rear wheels 13, 13 shown in FIG. 1 move forward at a low speed.

Thereafter, when released from the grip, the drive switching lever 91 automatically returns to the original neutral position shown in FIG. 12. Thus the pulling force applied to the wire cable 42 is eliminated, stopping the continuously variable transmission 30.

Figure 14:
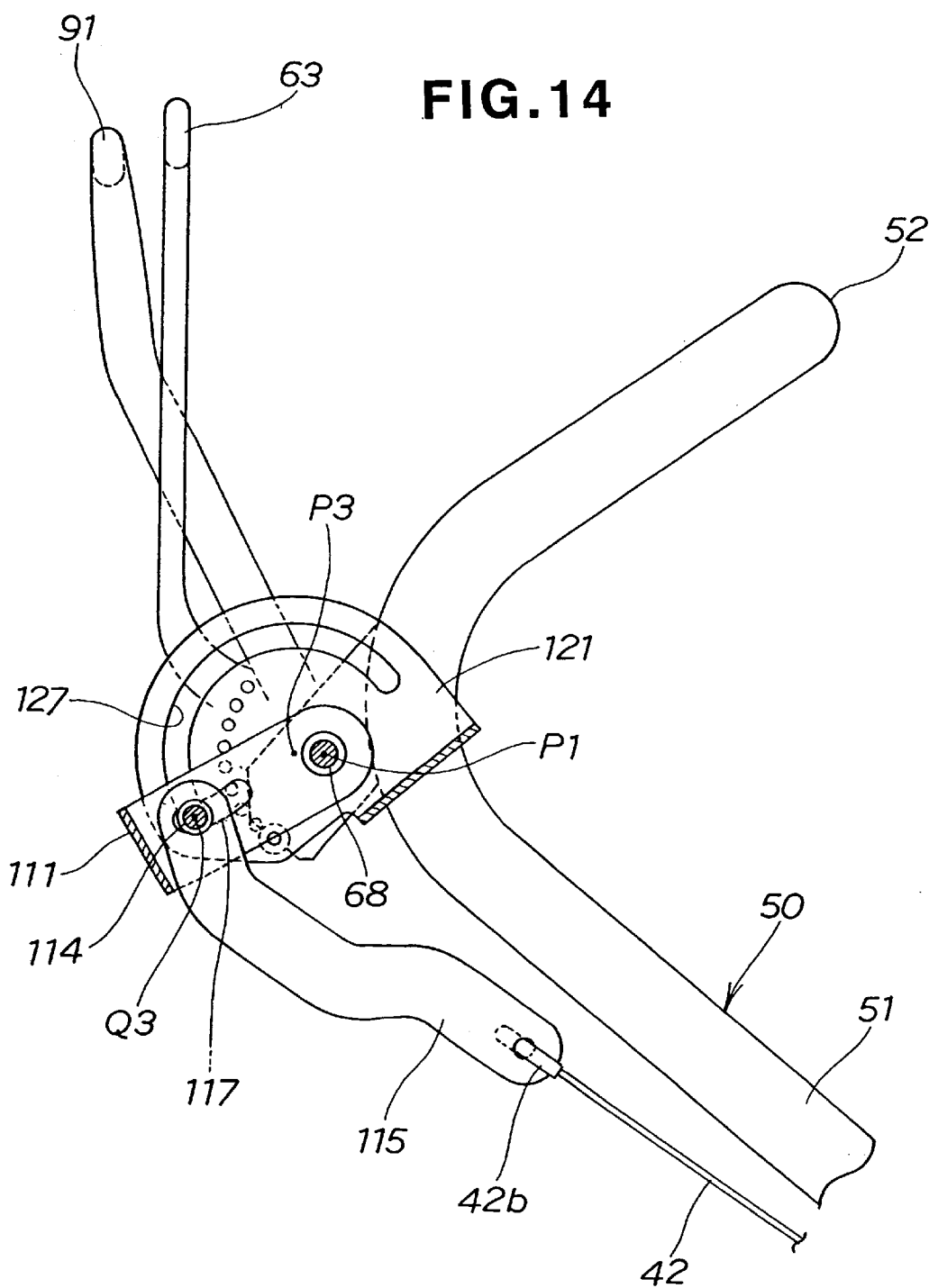
FIG. 14 is a partially cross-sectional view illustrating a disc rotated from the state in FIG. 12 with the speed adjusting rotary control, being set in a high-speed position.

FIG. 14 illustrates the disc 121 rotated clockwise by the rotary control 123 shown in FIG. 12 to be set in a high-speed position.

Specifically, the rotary control 123 is rotated clockwise, displacing the center of the arc hole 127 from the position P2 shown in FIG. 12 to a rearward position P3 shown in FIG. 14. As a result, the center of the arc hole 127 is in the position P3 offset from the rotational center P1 of the disc 121 rearward of the body (left in the figure). The arc hole 127 is positioned rearward and upward of the body (left upward in the figure). The center of the coupling pin 114 is in a position Q3 rearward and downward of the body. The operation switching lever 63 and the drive switching lever 91 are in the neutral positions.

Figure 15:
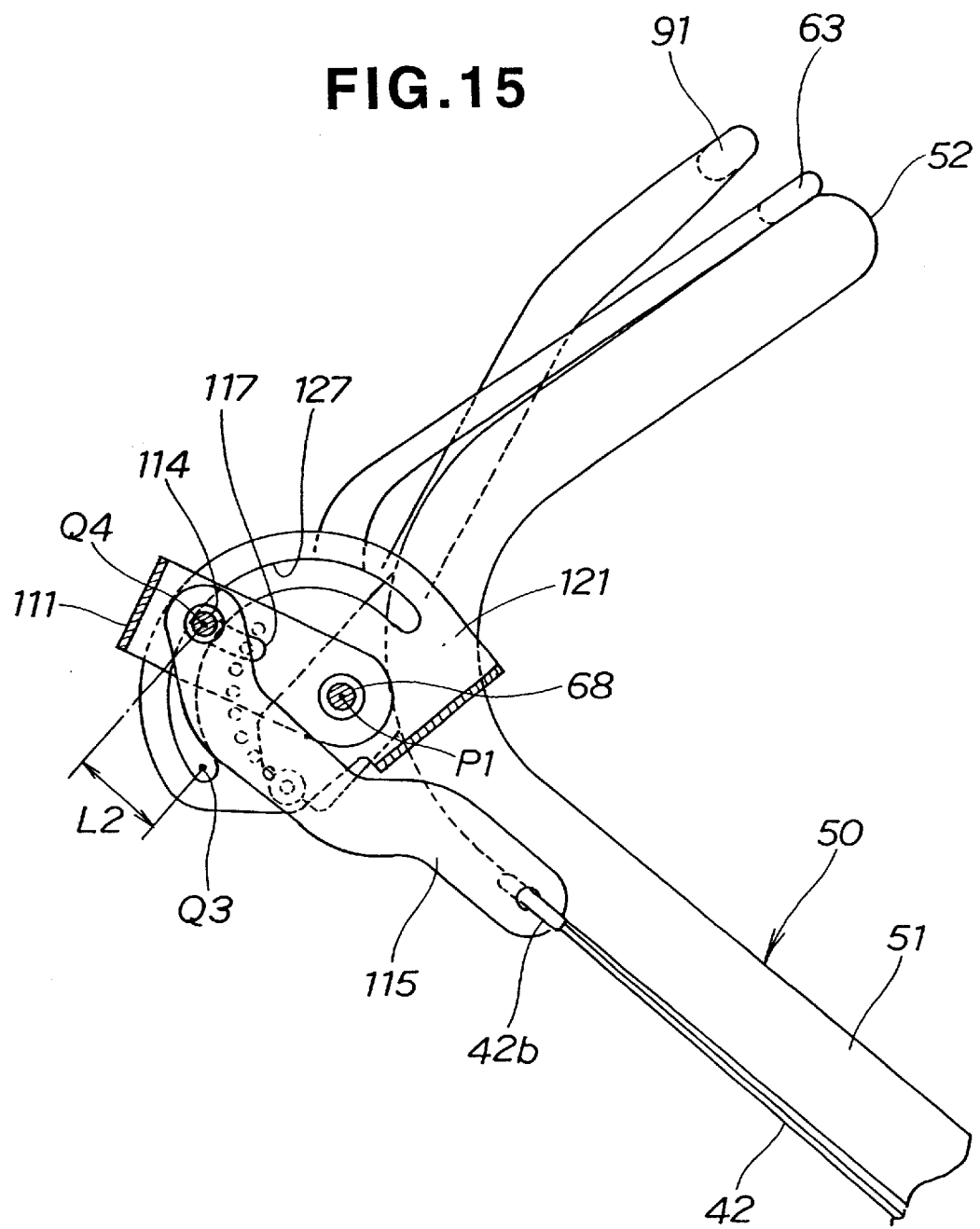
FIG. 15 is a partially cross-sectional view illustrating the drive switching lever rotated from the state shown in FIG. 14 toward the grip of the handle.

When the operation switching lever 63 and the drive switching lever are operated from the above state, the drive switching lever 91 swings clockwise as shown in FIG. 15, so that the coupling pin 114 is guided along the arc hole 127, being displaced clockwise. In this state, the center of the coupling pin 114 is in a position Q4. That is, the coupling pin 114 moves by a distance (travel amount) L2 from the position Q3 to the position Q4. The travel amount L2 is larger than the travel amount L1 (L1<L2). As a result, the wire cable 42 is pulled via the coupling arm 115 by a distance corresponding to the travel amount L2 of the coupling pin 114. The arm 39 of the continuously variable transmission 30 shown in FIG. 2 is thus swung to set the continuously variable transmission 30 in a high-speed condition. The rear wheels 13, 13 shown in FIG. 1 move forward at a high speed.

Thereafter, when released from the grip, the drive switching lever 91 automatically returns to the original neutral position shown in FIG. 14, so that the pulling force applied to the wire cable 42 is eliminated, stopping the continuously variable transmission 30.

Next, the above description with reference to FIGS. 12 to 15 is summarized and the reason why the travel amount L2 is greater than the travel amount L1 will be described with reference to FIG. 16.

Figure 16:
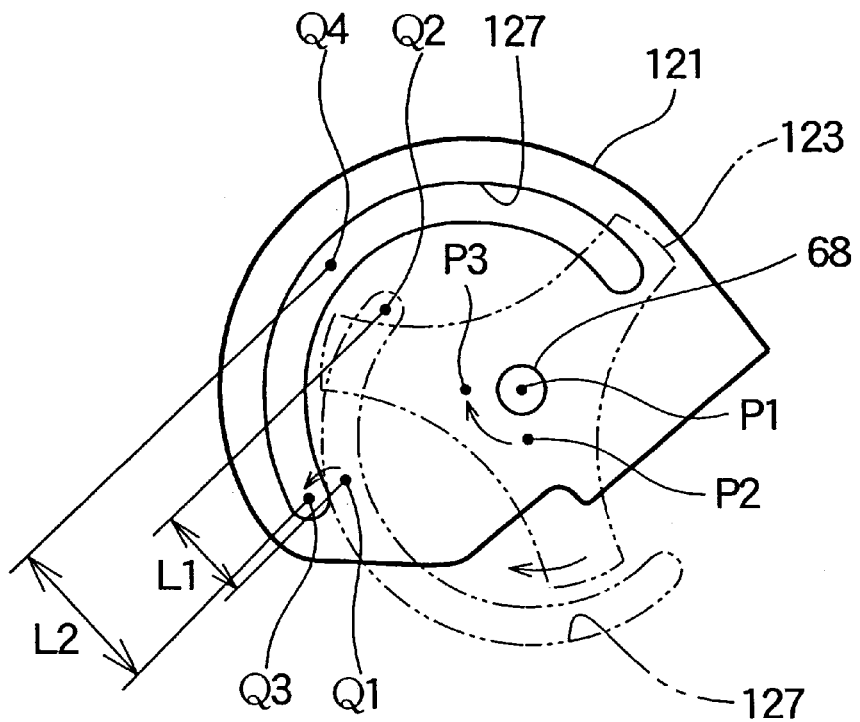
FIG. 16 is a view illustrating the relationship among the speed adjusting rotary control, the disc and a coupling pin according to the present invention shown in FIGS. 12 to 15.

FIG. 16 is a functional diagram of the disc and the coupling pin according to the present invention, illustrating the state where the disc 121 is rotated clockwise with the rotary control 123. Here the arc hole 127 shown in phantom lines and the center P2 of the arc hole 127 are in the original position shown in FIG. 12. In this state, the position Q1 of the coupling pin can be shifted by the travel amount L1 to the position Q2.

Thereafter the rotary control 123 shown in phantom lines is rotated clockwise, displacing the center P2 of the arc hole 127 rearward to the position P3. That is, the center of the arc hole 127 is in the position P3 offset from the rotational center P1 of the disc 121 rearward of the body (left in the figure). The arc hole 127 shown in phantom lines is displaced in a rearward and upward position (left upward in the figure) of the body as shown by solid lines. The position Q1 of the coupling pin is displaced to the position Q3. In this state, the position Q3 of the coupling pin can be shifted by the travel amount L2 to the position Q4.

Thus, the disc 121 is rotated clockwise with the rotary control 123, the center P2 of the arc hole 127 offset forward with respect to the rotational center P1 of the disc 121 is displaced rearward to the position P3. As a result, with respect to the inclination of the arc from the position Q1 to the position Q2, the arc from the position Q3 to the position Q4 is relatively upright. Thus the travel amount L2 is greater than the travel amount L1 (L1<L2).

Next, the function of the walk-behind, self-propelled working machine 10 is described with reference to FIG. 1.

The gripping or releasing of the operation switching lever 63 with the grip 52 can switch the driving force from the engine 15 to the blade 14 on or off. The gripping or releasing of the drive switching lever 91 with the grip 52 can operate the continuously variable transmission 30 to switch the rear wheels 13 from a halt condition to a high-speed advancement condition.

A member for adjusting the operation of the drive switching lever 91 to the continuously variable transmission 30 is the rotary control 123. The rotary control 123 is provided on the side of the handle 50 in the vicinity of the drive switching lever 91. Thus the rotary control 123 is positioned near at hand for an operator operating the walk-behind, self-propelled working machine 10. The rotation of the rotary control 123 enables the adjustment of the driving speed of the walk-behind, self-propelled working machine 10.

In order to adjust the driving speed while propelling the walk-behind, self-propelled working machine 10, the operator continuously grips the drive switching lever 91 with the grip 52 with one hand and rotates the rotary control 123 in the vicinity of the drive switching lever 91 with the other hand. In this manner, the drive switching lever 91 is operated with one hand and the rotary control 123 is operated with the other hand, which facilitates the adjustment of the driving speed.

Further, the operator only moves a hand from the grip 52 to the side of the handle and to the vicinity of the drive switching lever 91, which requires less moving range of the hand. Furthermore, the operation of merely rotating the rotary control 123 requires less operating range of the hand. This facilitates the adjusting operation of the driving speed while driving the walk-behind, self-propelled working machine 10 in a comfortable steering posture. Thus the operability is improved and the driving speed of the working machine 10 can be adjusted to improve cutting performance, without leaving grass to be cut or cutting grass unevenly.

In addition, provided on the side of the handle 50, the rotary control 123 can be rotated with a hand put over the side of the handle 50. Thus there is no need to remove both hands from the handle.

Although the lawn mower is exemplified as the walk-behind, self-propelled working machine 10 in the above embodiment, the present invention is not limited to the lawn mower and can be applied to various kinds of working machines such as grass cutting machines, cultivators, and snow removal machines.

The drive source is not limited to the engine 15 and may be an electrical motor.

The continuously variable transmission 30 may be any device which can steplessly or continuously switch the rear wheels 13 as driving wheels from a halt condition to a high-speed advancement condition, and is not limited to a hydraulic one.

In FIG. 4, the operating part 64 of the operation switching lever 63 may be provided in a right position with respect to the body center Cb. The rotary control 123 may be rotatably mounted on the left support shaft 62 supporting the drive switching lever 91, opposing the operating part 64.

The present disclosure relates to the subject matter of Japanese Patent Application No. 2001-123276, filed Apr. 20, 2002, the disclosure of which is expressly incorporated herein by reference in its entirety.

What is claimed is:

1. A walk-behind, self-propelled working machine, comprising:
   a machine body;
   a drive source mounted on the machine body;
   a pair of driving wheels mounted on the machine body and rotationally driven by the drive source;
   a working tool mounted on the machine body and driven by the drive source;
   a continuously variable transmission interposed between the drive source and the pair of driving wheels;
   an operating handle extending from a rear end portion of the machine body;
   a grip mounted on the operating handle;
   an operation switching lever mounted on the operating handle in the vicinity of the grip for transmitting or interrupting a driving force outputted from the drive source to the working tool;
   a drive switching lever mounted on the handle independently from the operation switching lever and in the vicinity of the grip for undergoing pivotal movement for operating the continuously variable transmission to switch the pair of driving wheels from a halt condition to a high-speed advancement condition; and
   a variable speed adjustment mechanism for adjusting a rotational speed of the driving wheels, the variable speed adjustment mechanism having a disc rotatably mounted on the operating handle and having a slot disposed eccentrically relative to an axis of rotation of the disc, a speed adjusting rotary control member mounted on a side portion of the operating handle in the vicinity of the drive switching lever and connected to the disc for rotation therewith, a shift arm connected to the drive switching lever for undergoing pivotal movement therewith and connected to the disc for relative movement therewith in response to pivotal movement of the drive switching lever, and a positioning mechanism for positioning the disc at a preselected angular position relative to the shift arm and the drive switching lever by rotation of the speed adjusting rotary control member to adjust the rotational speed of the driving wheels.

2. A working machine according to claim 1; further comprising a pair of support shafts mounted on the operating handle; and wherein each of the operation switching lever and the drive switching lever is mounted on a respective one of the support shafts for undergoing pivotal movement relative to the operating handle, the operation switching lever having an operating part extending from a longitudinal center of machine body, and the speed adjusting rotary control member being rotatably mounted on the support shaft on which the drive switching lever is mounted and being disposed opposite to the operating part of the operation switching lever.

3. A working machine according to claim 1; further comprising a coupling arm connected to the continuously variable transmission mechanism; and a pin for connecting the coupling arm to the shift arm and the disc so that the pin can move along the slot of the disc in response to pivotal movement of the drive switching lever to thereby control operation of the continuously variable transmission to adjust the rotational speed of the driving wheels.

4. A working machine according to claim 3; wherein the positioning mechanism comprises a plurality of positioning holes formed in the disc along a circular locus concentric with the rotational axis of the disc, and a spring-loaded ball member for selectively engaging one of the positioning holes.

5. A working machine according to claim 1; wherein the positioning mechanism comprises a plurality of positioning holes formed in the disc along a circular locus concentric with the rotational axis of the disc, and a spring-loaded ball member for selectively engaging one of the positioning holes.

6. A working machine according to claim 1; wherein the drive source has an output shaft and the continuously variable transmission has an input shaft; and further comprising an operation switching clutch for transmitting power of the drive source from the output shaft to the input shaft through a transmission member.

7. A working machine according to claim 6; wherein the operation switching lever switches the operation switching clutch via a wire cable so as to transmit or interrupt the driving force from the drive source to the working tool.

8. A working machine according to claim 7; wherein the operation switching clutch is switched to allow the driving force from the drive source to be transmitted to the working tool only when the wire cable is pulled with the operation switching lever.

9. A working machine according to claim 6; further comprising biasing means for biasing the wire cable to a condition in which the driving force of the drive source is not transmitted to the working tool.

10. A walk-behind, self-propelled working machine, comprising:
- a machine body;
- a drive source mounted on the machine body;
- a plurality of driving wheels mounted on the machine body and rotationally driven by the drive source;
- a working tool mounted on the machine body and driven by the drive source;
- a continuously variable transmission disposed between the drive source and the driving wheels;
- a handle having a grip configured to be gripped by at least one hand of an operator;
- an operation switching lever mounted on the handle in the vicinity of the handle grip and arranged to be manipulated by one of the hands of the operator to undergo pivotal movement relative to the handle grip for transmitting or interrupting a driving force outputted from the drive source to the working tool;
- a drive switching lever mounted on the handle independent from the operation switching lever and arranged to be manipulated by one of the hands of the operator to undergo pivotal movement relative to the handle for operating the continuously variable transmission to switch the driving wheels from a halt condition to a high-speed advancement condition;
- a disc mounted on the handle for undergoing rotational movement relative to the drive switching lever; and
- a control member for positioning the disc at a preselected angular position relative to the drive switching lever to regulate an amount of pivotal movement of the drive switching lever for adjusting a rotational speed of the driving wheels, the control member being mounted on the handle and arranged to be manipulated by one of the hands of the operator while the drive switching lever is being manipulated by the other hand of the operator.

11. A working machine according to claim 10; wherein the disc has a plurality of positioning holes formed along a circular locus concentric with a rotational axis of the disc and each corresponding to a preselected angular position of the disc; and further comprising a spring-loaded ball member for selectively engaging one of the positioning holes by rotation of the disc during manipulation of the control member to position the disc at a preselected angular position relative to the drive switching lever.

12. A working machine according to claim 10; further comprising a shift arm connected to the drive switching lever for undergoing pivotal movement therewith and connected to the disc for relative movement therewith in response to pivotal movement of the drive switching lever.

13. A working machine according to claim 12; wherein the disc has a slot disposed eccentrically relative to an axis of rotation of the disc; and further comprising a coupling arm connected to the continuously variable transmission mechanism and a pin for connecting the coupling arm to the shift arm and the disc so that the pin can move along the slot of the disc in response to pivotal movement of the drive switching lever to thereby
control operation of the continuously variable transmission and adjust the rotational speed of the driving wheels.

14. A working machine according to claim 10; further comprising a pair of support shafts mounted on the handle; and wherein each of the operation switching lever and the drive switching lever is mounted on a respective one of the support shafts for undergoing pivotal movement relative to the handle, the operation switching lever having an operating part extending from a longitudinal center of machine body, and the control member being rotatably mounted on the support shaft on which the drive switching lever is mounted and being disposed opposite to the operating part of the operation switching lever.

15. A working machine according to claim 10; wherein the drive source has an output shaft and the continuously variable transmission has an input shaft; and further comprising an operation switching clutch for transmitting power of the drive source from the output shaft to the input shaft through a transmission member.

16. A working machine according to claim 15; wherein the operation switching lever switches the operation switching clutch via a wire cable so as to transmit or interrupt the driving force from the drive source to the working tool.

17. A working machine according to claim 16; wherein the operation switching clutch is switched to allow the driving force from the drive source to be transmitted to the working tool only when the wire cable is pulled with the operation switching lever.

18. A working machine according to claim 16; further comprising biasing means for biasing the wire cable to a condition in which the driving force of the drive source is not transmitted to the working tool.

19. A working machine according to claim 15; wherein the transmission member comprises a driven pulley, a driving pulley for driving the driven pulley, and a belt interconnecting the driven and driving pulleys together.

20. A working machine according to claim 10; wherein the working tool comprises a grass-cutting blade.

* * * * *